(12) United States Patent
Schambach

(10) Patent No.: US 8,457,298 B2
(45) Date of Patent: Jun. 4, 2013

(54) METHOD AND SYSTEM FOR PROFILING MULTI-CHANNEL CONSUMERS IN A CALL CENTER ENVIRONMENT

(75) Inventor: Stephan Schambach, Concord, MA (US)

(73) Assignee: Demandware, Inc., Woburn, MA (US)

( * ) Notice: Subject to any disclaimer, the term of this patent is extended or adjusted under 35 U.S.C. 154(b) by 1259 days.

(21) Appl. No.: 11/801,577

(22) Filed: May 9, 2007

(65) Prior Publication Data

US 2008/0279353 A1    Nov. 13, 2008

(51) Int. Cl.
*H04M 3/00* (2006.01)
(52) U.S. Cl.
USPC ............... 379/265.09; 379/93.12; 379/265.11
(58) Field of Classification Search
USPC ................. 379/93.12, 93.23, 220.01, 265.09, 379/265.11; 709/203, 217, 218, 227
See application file for complete search history.

(56) References Cited

U.S. PATENT DOCUMENTS

| 2007/0011337 A1* | 1/2007 | Brown et al. ................. 709/227 |
| 2007/0124290 A1* | 5/2007 | Swanson et al. ................. 707/3 |
| 2007/0294354 A1* | 12/2007 | Sylvain ........................ 709/206 |

* cited by examiner

*Primary Examiner* — Antim Shah
(74) *Attorney, Agent, or Firm* — Wilmer Cutler Pickering Hale & Dorr LLP.

(57) ABSTRACT

A method of providing information related to a user's web browser session to an agent, while the agent is processing a call from the user, includes creating an association between a telephone number and the user's web browser session. The user employs the telephone number to place a telephone call. The method further includes receiving the telephone call from the user, and determining, upon receipt of the telephone call from the user, the telephone number with which the user placed the call. The method further includes using the determined telephone number and the association to identify the information related to the user's web browser session. The method also includes routing the telephone call and the information related to the user's web browser session to the agent.

17 Claims, 1 Drawing Sheet

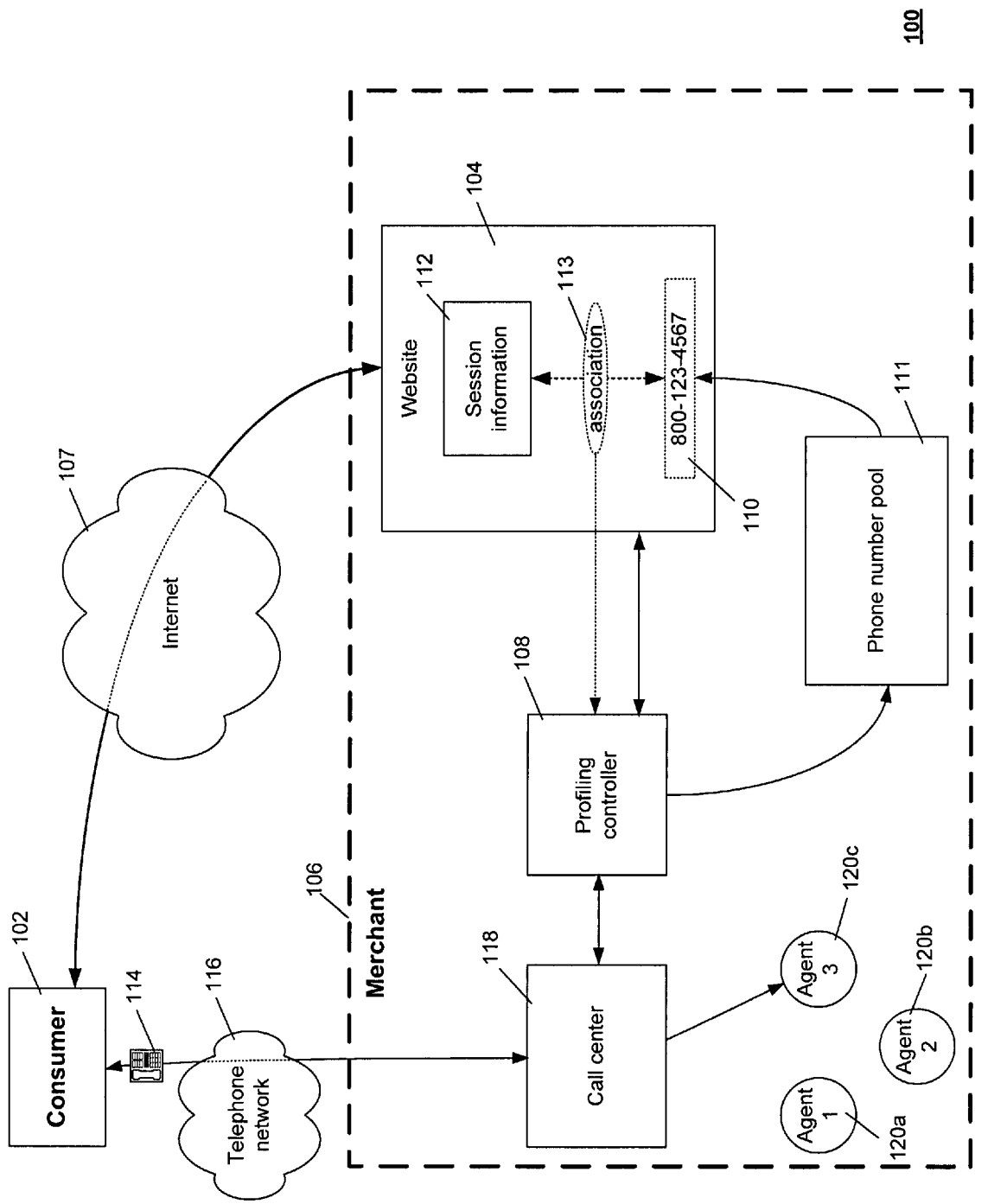

METHOD AND SYSTEM FOR PROFILING MULTI-CHANNEL CONSUMERS IN A CALL CENTER ENVIRONMENT

BACKGROUND OF THE INVENTION

The present invention relates to electronic commerce, and more particularly, to techniques for providing a merchant with detailed information relating to a particular consumer, while conducting a transaction with the consumer.

When a consumer shops for products and/or services "online" (e.g., by viewing websites via the Internet) using a computer-based website browser, the consumer often spends a significant amount of time navigating through the merchant's website before actually purchasing anything. Sometimes a consumer enters a website without a clear idea of what he or she is looking for, and explores or "surfs" until they stumble upon something that interests them enough to buy. Even if the consumer begins an online search knowing exactly what they want or need to purchase, the consumer may still spend a significant amount of time on a website—for example, gathering information about the product or service, comparing similar items, or reviewing accessories or other related products.

During the online shopping session, a consumer may come to a point at which he or she desires detailed information about a particular product, service or other aspect of the merchant's website. If a customer service telephone number (e.g., a "help line") is available on the website, the consumer may call the number to ask some pointed, focused questions.

The phone number typically connects the consumer to a call distribution system, which routes the consumer to an available sales agent. When the agent receives the consumer's call, it is extremely useful for the agent to have access to certain information about the consumer. For example, if the agent knows and understands the caller's interests, the agent can use those interests to make helpful and useful recommendations to the consumer.

One way for the agent to know the caller's interests is to examine the caller's recent web browsing history. For example, if the agent knows exactly what the consumer was viewing on the website immediately preceding the phone call, the agent can often deduce the target of the consumer's search, and can provide relevant suggestions accordingly.

If the agent is cognizant of the consumer's past shopping habits and past purchases, the agent can also use that information to tailor the rest of the conversation so as to increase the likelihood of convincing the consumer to actually buy something. For example, if the past shopping habits and post purchases indicate that the consumer is a relatively hard sell, the agent may wish to be careful and less aggressive.

In some existing systems, an agent can use the caller identification (caller ID) information associated with the incoming call to ascertain who is calling. The agent can then search his company's database systems with respect to the name extracted from caller ID, to determine if any information associated with the name exists. If it does, the agent can use the information to advance the transaction towards a close.

There are several drawbacks to using caller ID for this purpose. For example, the caller ID information may not actually identify the caller. For instance, if the consumer calls from his or her workplace, the caller ID will typically identify the consumer's employer instead of the consumer. Or, if the consumer is calling from a cellular telephone, the caller ID will provide a telephone number, but will not typically provide information about the identity of the caller.

In some instances, the agent can simply ask the consumer for some identifying information. However, many consumers are hesitant to provide information unless the consumer is highly interested in completing the transaction or receiving some customer service from the merchant. Further, the solicited information will not provide any insight as to the consumers browsing activities on the website, unless the identifying information is related to a transaction that has already taken place (e.g., a confirmation number or order number).

SUMMARY OF THE INVENTION

The described embodiments of a profiling system associate a telephone number with a consumer's session on a merchant's website. The system provides the telephone number to the consumer by displaying it on the website, along with an invitation for the consumer to contact the merchant via the telephone number for additional information or help.

When the consumer uses the telephone number, he or she is linked to a call center associated with the merchant. The call center identifies the telephone number of the call from the consumer and provides the telephone number to an analysis function.

The analysis function has access to the association between the telephone number and the consumer's session, and uses that association to determine information about the user's session, such as what the consumer has been receiving (e.g., viewing or downloading) and inputting (e.g., selections via keystrokes, mouse clicks or uploads) during the browser session.

The analysis function uses information about the user's session to enhance the merchant's interaction with the user.

In one aspect, the invention is a method of providing information related to a user's web browser session to an agent, while the agent is processing a call from the user. The method includes creating an association between a telephone number and the user's web browser session, and receiving a telephone call from the user. The user employs the telephone number to place the telephone call. Upon receipt of the telephone call from the user, the method further includes determining the telephone number with which the user placed the call, and using the determined telephone number and the association to identify the information related to the user's web browser session. The method further includes routing the telephone call and the information related to the user's web browser session to the agent.

One embodiment further includes selecting the telephone number associated with the user's web browser session from a pool of telephone numbers. Another embodiment further includes selecting the telephone number associated with the user's web browser session from a pool of toll free telephone numbers. Yet another embodiment further includes processing the information related to the user's web browser session to generate derived data, and providing the derived data to the agent.

In one embodiment, the processing further includes identifying product categories the user has viewed on the web browser. In another embodiment the processing further includes identifying products or services related to products or services the user has been viewing on the web browser. Other embodiments further include determining an appropriate agent for receiving the telephone call from the user.

One embodiment further includes tagging the telephone number with a time value when the telephone number is associated with the user's web browser session.

One embodiment further includes returning the telephone number to a pool of telephone number when the time value indicates that the telephone number has been associated with the user's web browser session for a predetermined amount of time.

In some embodiments, the method further includes selecting a marketing algorithm for the agent according to the information related to the user's web browser session.

Another aspect is a system for providing information related to a user's web browser session to an agent, while the agent is processing a call from the user. The system includes a profiling controller for creating an association between a telephone number and the user's web browser session. The system further includes a call center for receiving a telephone call from the user, wherein the user employs the telephone number to place the telephone call. The profiling controller determines, upon receipt of the telephone call from the user, the telephone number with which the user placed the call. The profiling controller uses the determined telephone number and the association to identify the information related to the user's web browser session. The profiling controller also routes the telephone call and the information related to the user's web browser session to the agent.

Another aspect is machine-readable media having stored thereon a sequence of instructions. When executed by a processor, the instructions cause the processor to create an association between a telephone number and the user's web browser session, and receive a telephone call from the user. The user employs the telephone number to place the telephone call. Upon receipt of the telephone call from the user, the processor determines the telephone number with which the user placed the call, and uses the determined telephone number and the association to identify the information related to the user's web browser session. The processor routes the telephone call and the information related to the user's web browser session to the agent.

BRIEF DESCRIPTION OF DRAWINGS

FIG. 1 shows one embodiment of a profiling system according to the invention.

DESCRIPTION OF THE PREFERRED EMBODIMENTS

FIG. 1 shows one embodiment of a profiling system 100 constructed and arranged according to the invention. A consumer 102 accesses the website 104 of a merchant 106 in a web browser session via the Internet 107, to purchase or research a product or service, or to gather information.

A profiling controller 108 selects a telephone number 110 from a pool 111 of telephone numbers, and creates an association 113 between the telephone number 110 and information 112 related to the website session currently being conducted by the consumer 102. In one embodiment, the pool 112 of telephone numbers is a pool of toll free (e.g., "800" numbers), although in other embodiments the pool may include other types of telephone numbers (i.e., ordinary toll numbers), or a combination of different types of telephone numbers.

In some embodiments, the telephone numbers selected from the pool 112 are "tagged" (i.e., associated) with a time value (i.e., a time of day and/or a date), corresponding to when the number was taken from the pool 112 and associated with a website. This allows the profiling controller 108 to determine how long each telephone number selected from the pool 112 has been active, so that the profiling controller 108 can return a telephone number to the pool 112 after a certain amount of time. This prevents a situation where a consumer writes down a phone number during a web browser session and then uses it weeks or months later. If this happens, the session history associated with the phone number may no longer exist or may no longer be relevant.

The actual value of the "certain amount of time" referred to above for returning a phone number to a pool will depend on a number of factors, such as the nature of the merchant's business and the capabilities of the merchant's website. For example, some merchant's offerings change on a seasonal basis, so that information from a session history created in the spring may be irrelevant in the summer or fall. In other embodiments, the time it takes to return a number to the pool may be changed (e.g., extended) if the consumer actually uses the number to contact the merchant.

In different embodiments, the profiling controller may use different techniques to select a particular telephone number from the pool. For example, in one embodiment the profiling controller treats the pool in a "first in, first out" manner, so that when the profiling controller returns a particular number N1 to the pool, the profiling controller will select all other numbers in the pool before reselecting the number N1. This technique reduces the likelihood that a particular number will still be active when it is selected from the pool for association with the information related to the website session. In some embodiments, the profiling controller 108 randomly selects a telephone number from the pool 111, while in other embodiments the profiling controller 108 selects a particular telephone number based on one or more characteristics of the website 104. In some embodiments, the profiling controller 108 instructs or otherwise stimulates the number pool 111 to provide a number to the website 104, rather than selecting the number itself and providing the number to the website 104.

In this embodiment the information 112 is referred to as the "session history," i.e., information related to the current consumer's website session. In general, however, the information 112 may also (or alternatively) include information beyond the current web browser session such as data regarding past purchases of the consumer, information the consumer viewed in previous sessions, personal data related to the consumer, and products/service the consumer has selected for purchase but has not actually purchased, among others.

The system 100 presents the telephone number 110 to the consumer during the web browser session. Typically the website 104 displays text and/or images encouraging the consumer 102 to call the telephone number 110 to obtain assistance or more detailed information about a particular subject, product or service.

If the consumer 102 decides to accept the invitation to use the telephone number 110, the consumer 102 enters the telephone number 110 on a telephone 114 to call the merchant 106 through the ordinary public telephone system 116.

The telephone call from the consumer 102 terminates at a call center 118. Using techniques well known in the art, the call center 118 determines the telephone number 110 that the consumer is using to call the call center 118. The call center provides the telephone number 110 to the profiling controller 108, and the profiling controller 108 acquires the consumer's session history 112 through the association 113 between the telephone number 110 and the session information 112.

The profiling controller 108 evaluates the consumer's session history 112 and cooperates with the call center 118 to select an appropriate and/or available agent 120 (i.e., 120a, 120b or 120c in this embodiment) to handle the call. The call center 118 and the profiling controller 108 may use one or more of various criteria related to the session history 112 to determine which agent 120 is appropriate. Such criteria include, but are not limited to, (1) the types or categories of products, product lines or services the consumer has been viewing, (2) past purchases, (3) products previously selected but not purchased, (4) articles or reviews recently viewed or accessed by the consumer, (5) personal data associated with the consumer, recent keyword searches performed by the consumer, and the content of the consumer's online shopping cart.

One application of the session history 112 is for use with "skills-based routing" techniques. The concept of skills based routing is that if one knows what products, product lines, etc., that a consumer has been viewing, that knowledge can be used to direct or route the call to an appropriate agent with specific skills and knowledge in the product or service area. Working with an agent that is familiar and knowledgeable in the area of the consumer's interest is more likely to satisfy the customer.

Once an agent 120 (in this case Agent 3, 120c) has been selected to handle the consumer's call, the profiling controller 108 and the call center provide the agent 120 with the session history 112, or data that the profiling controller 108 derives from the session information.

As an example of data derived from the session history 112, consider session information that shows the consumer viewing three plasma television models in the $4,000 to $5,000 price range. The profiling system may derive from this information that the consumer is shopping for mid to high-end televisions. The agent 120 could use this derived fact to suggest other technology televisions (e.g., LCD) to the consumer, or direct the consumer to informational reviews or tutorials on the website. 104.

Other uses for the session history 112 or data derived from the session information 112 include, but are not limited to, up-selling and cross-selling. Regarding up-selling, consider the television example above. Suppose in addition to indicating that the consumer has been viewing plasma television in the $4,000 to $5,000 price range, the history 112 also shows that the consumer has read a review on new, larger models in the $6,000 to $7,000 range. The agent 120 would use this information to deduce that the consumer 102 may be willing to upgrade to a more expensive model than the ones he has been viewing. In one embodiment, the profiling controller 108 itself analyzes the session history and simply provide a directive of "up-sell" with respect to this consumer to the agent 120.

Regarding cross-selling, the session history 112 could be used, either by the agent or by the profiling controller 108, to deduce that the consumer would be a likely target for cross-selling products or services. Examples of cross-selling products related to the television example above include home theater sound systems or surge suppression equipment. Examples of cross-selling services include installation service contracts.

In at least one embodiment, the profiling system described herein is implemented by software executing on a computer platform such as a personal computer or a server. The software is stored as instruction code for the computer platform's host processor on a memory medium known in the art, such as a disk drive or a flash memory device. In other embodiments, the profiling system described herein is implemented in hardware devices, such as one or more ASICs, neural networks or other hardware devices. In yet other embodiments, the profiling system describe herein is implemented in a combination of software and hardware devices as described above.

Other uses exist for the concepts described herein. For example, the profiling system can be used to enhance customer service calls. Suppose a consumer completes a sale on a website, then decides he or she needs to revise or cancel the order. With existing systems, the consumer would dial the "help line" or equivalent telephone number and then would need to provide a confirmation number or order number corresponding to the order. With the profiling system described herein, the telephone number 110 of FIG. 1 would be associated to the web browser session during which the consumer made the purchase that needs revising. The profiling controller 108 uses the known association between the phone number and the session history 112 to extract the session history and thus the order information. Given the order information, the agent 120 would be able to address the consumer by name and recite the order information back to the consumer.

The profiling system described herein is useful for implementing various precision marketing algorithms, such as promotion algorithms. Often an agent is authorized to offer the consumer a promotion, for example a free surge suppressor and HDMI cable with the purchase of any plasma television costing more than $3000 and purchased by a particular time deadline. Such precision marketing techniques tend to be most effective when the interests of the target consumer are known to a high degree. Therefore the profiling system described herein can use the session history 112 acquired by its association to a specific telephone number 110 to determine which particular precision marketing algorithm should be used. The profiling system can also use the session history 112 to refine the parameters of a particular algorithm.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A method of providing information related to a user's web browser session to an agent, while the agent is processing a call from the user, comprising:

creating at a profiling controller an association between a telephone number to be entered by the user and the user's web browser session maintained at a web server, wherein the telephone number is selected from a pool of telephone numbers;

tagging at the profiling controller the telephone number with a time value when the telephone number is associated with the user's web browser session, wherein the time value indicates an amount of time during which the telephone number can be used in connection with the associated web browser session before the telephone number is returned to the pool of telephone numbers for reuse;

receiving at a call center a telephone call from the user, wherein the user employs the telephone number to place the telephone call by entering the telephone number on a telephone;

upon receipt of the telephone call from the user, determining at the profiling controller the telephone number with which the user placed the call, and using the determined telephone number and the association to identify at the profiling controller the information related to the user's web browser session;

selecting at the profiling controller a marketing algorithm from a plurality of precision marketing algorithms based at least in part on at least a part of the information related to the user's web browser session;

routing from the profiling controller the telephone call, the selected marketing algorithm and the information related to the user's web browser session to the agent; and processing the information related to the user's web browser session to generate derived data and providing the derived data to the agent, wherein the processing further includes identifying products or services related to products or services the user has been viewing on the web browser.

2. The method of claim 1, wherein the pool of telephone numbers includes a pool of toll free telephone numbers.

3. The method of claim 1, wherein the processing further includes identifying product categories the user has viewed on the web browser.

4. The method of claim 1, wherein the processing further includes determining an appropriate agent for receiving the telephone call from the user.

5. The method of claim 1, further including returning the telephone number to the pool of telephone numbers when the time value reaches the predetermined amount of time.

6. The method of claim 1, wherein the time value is determined based at least in part on at least one of: a nature of a business involving the web browser session and a capacity of a web site related to the web browser session.

7. The method of claim 1, further comprising refining at least one parameter of the selected marketing algorithm based at least in part on at least a part of the information related to the user's web browser session.

8. The method of claim 5, wherein the returned telephone number is not selected again until all other telephone numbers in the pool of telephone numbers are selected first.

9. A system for providing information related to a user's web browser session to an agent, while the agent is processing a call from the user, comprising:

a profiling controller for creating an association between a telephone number to be entered by the user and the user's web browser session maintained at a web server and for tagging the telephone number with a time value when the telephone number is associated with the user's web browser session, wherein the telephone number is selected from a pool of telephone numbers and wherein the time value indicates an amount of time during which the telephone number can be used in connection with the associated web browser session before the telephone number is returned to the pool of telephone numbers for reuse; and a call center for receiving a telephone call from the user, wherein the user employs the telephone number to place the telephone call by entering the telephone number on a telephone;

wherein the profiling controller
(i) determines, upon receipt of the telephone call from the user, the telephone number with which the user placed the call;
(ii) uses the determined telephone number and the association to identify the information related to the user's web browser session;
(iii) selects a marketing algorithm from a plurality of precision marketing algorithm based at least in part on at least a part of the information related to the user's web browser session;
(iv) routes the telephone call, the selected marketing algorithm and the information related to the user's web browser session to the agent; and
(v) processes the information related to the user's web browser session to generate derived data, and provides the derived data to the agent, wherein the profiling controller identifies products or services related to products or services the user has been viewing on the web browser.

10. The system of claim 9, wherein the pool of telephone numbers includes a pool of toll free telephone numbers.

11. The system of claim 9, wherein the profiling controller identifies product categories the user has viewed on the web browser.

12. The system of claim 9, wherein the profiling controller determines an appropriate agent for receiving the telephone call from the user.

13. The system of claim 9, wherein the profiling controller returns the telephone number to the pool of telephone numbers when the time value reaches the predetermined amount of time.

14. The system of claim 9, wherein the time value is determined based at least in part on at least one of: a nature of a business involving the web browser session and a capacity of a web site related to the web browser session.

15. The system of claim 9, where the profiling controller refines at least one parameter of the selected marketing algorithm based at least in part on at least a part of the information related to the user's web browser session.

16. The system of claim 13, wherein the profiling controller selects all other telephone numbers in the pool of telephone numbers before selecting the returned telephone number again.

17. A non-transitory, machine readable media having stored thereon a sequence of instructions which, when executed by a processor cause the processor to perform the following:

creating at a profiling controller an association between a telephone number to be entered by the user and the user's web browser session maintained at a web server, wherein the telephone number is selected from a pool of telephone numbers;

tagging at the profiling controller the telephone number with a time value when the telephone number is associated with the user's web browser session, wherein the time value indicates an amount of time during which the telephone number can be used in connection with the associated web browser session before the telephone number is returned to the pool of telephone numbers for reuse;

receiving at a call center a telephone call from the user, wherein the user employs the telephone number to place the telephone call by entering the telephone number on a telephone;

upon receipt of the telephone call from the user, determining at the profiling controller the telephone number with which the user placed the call, and using the determined telephone number and the association to identify at the profiling controller the information related to the user's web browser session;

selecting at the profiling controller a marketing algorithm from a plurality of precision marketing algorithms based at least in part on at least a part of the information related to the user's web browser session;

routing from the profiling controller the telephone call, the selected marketing algorithm and the information related to the user's web browser session to the agent; and processing the information related to the user's web browser session to generate derived data and providing the derived data to the agent, wherein the processing further includes identifying products or services related to products or services the user has been viewing on the web browser.

\* \* \* \* \*